3,849,574
α-SUBSTITUTED-β-ARYLTHIOALKYL AMINO-ACIDS, FOR INCREASING HEART RATE

John T. Suh, Mequon, Wis., assignor to Colgate-Palmolive Company, New York, N.Y.
No Drawing. Continuation-in-part of application Ser. No. 146,534, May 24, 1971, which is a continuation-in-part of application Ser. No. 764,624, Oct. 2, 1968, both now abandoned. This application June 26, 1973, Ser. No. 373,800
Int. Cl. A61k 27/00
U.S. Cl. 424—319                1 Claim

ABSTRACT OF THE DISCLOSURE

The compounds are α - substituted - β - arylthioalkyl amino-acids which possess cardiac stimulant activity. A method of stimulating the heart and pharmaceutical compositions containing the compounds are described.

RELATED CASES

This application is a continuation-in-part of my earlier application Ser. No. 146,534 filed May 24, 1971, now abandoned which is in turn a continuation-in-part of my application Ser. No. 764,624 filed Oct. 2, 1968, now abandoned.

SUMMARY OF THE INVENTION

The present invention relates to compounds of the formula

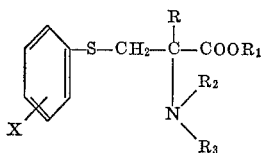

in which X is hydrogen, a halogen such as chloro or bromo, trifluoromethyl, a lower alkoxy such as methoxy or ethoxy or nitro, R is a lower alkyl of 1 to 4 carbon atoms such as methyl, ethyl or isopropyl, phenyl, a cycloalkyl of 3 to 7 carbon atoms, a cycloalkyl-lower alkyl in which the cycloalkyl contains 3 to 7 carbon atoms, and phenyl-lower alkyl of 7 to 13 carbon atoms such as benzyl, phenethyl or phenylisopropyl, $R_1$ is hydrogen or a lower alkyl of 1 to 4 carbon atoms, and $R_2$ and $R_3$ are selected from hydrogen, a lower alkyl of 1 to 4 carbons, a cycloalkyl of 3 to 7 carbon atoms such as cyclopropyl and cyclohexyl, a cycloalkyl-lower alkyl in which the cycloalkyl contains 3 to 7 carbon atoms such as cyclohexyl methyl or cyclopentyl ethyl and phenyl-lower alkyl of 7 to 13 carbon atoms such as benzyl, phenethyl or phenylisopropyl.

The compounds of the present invention are preferably prepared by reacting a thiophenol such as p-chlorothiophenol with a chloroketone such as chloroacetone in a sodium hydroxide solution of form 1 - (p - chlorophenylthio) - 2 - propanone. A dispersion of the 1-(p-chlorophenylthio) - α - propanone is then treated with a mixture of ammonium carbonate and potassium cyanide in aqueous ethanol at reflux to prepare 4 - (p - chlorophenylthiomethyl)-4-methylhydantoin. The latter compound is then treated with barium hydroxide octahydrate in water at reflux until the reaction is complete and acidified to yield the β - (p - chlorophenylthio) - α - methylalanine.

The described process may be illustrated as follows:

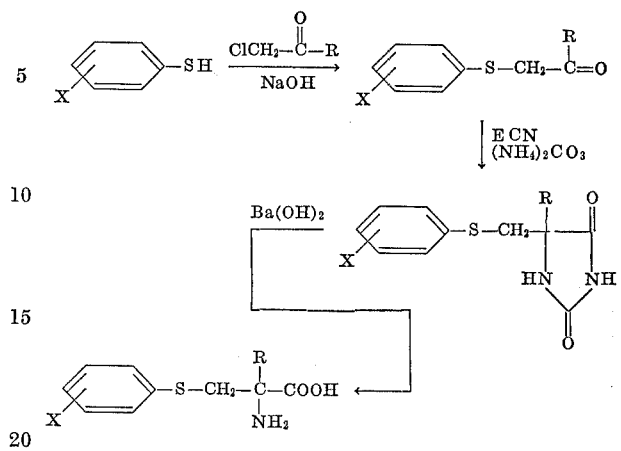

in which X and R are as previously described and do not interfere with or partake in the reactions.

Representative of the thiophenols which may be employed as starting materials are p-Chlorothiophenol,
m-Chlorothiophenol,
p-Methoxythiophenol,
p-Nitrothiophenol,
p-trifluoromethylthiophenol,
m-Benzyloxythiophenol, and
o-Bromothiophenol.

Representative of the ketones that may be employed as reactants are

Chloroacetone,
Bromoacetone,
Bromomethyl n-propyl ketone,
Chloromethyl phenyl ketone, and
Bromomethyl isopropyl ketone.

Representative of the final compounds which may be prepared by the described process are β-(p-Chlorophenylthio)-α-methylalanine,
β-(p-Chlorophenylthio)-α-ethylalanine,
β-(p-Methoxyphenylthio)-α-methylalanine,
β-(p-Trifluoromethylphenylthio)-α-ethylalanine,
β-(m-Trifluoromethylphenylthio)-α-isopropylalanine,
β-(o-Bromophenylthio)-α-phenylalanine, and
β-(p-Benzyloxyphenylthio)-α-ethylalanine.

The compounds in which $R_3$ and $R_4$ are other than hydrogen may be prepared by conventional means. For example, the compounds in which $R_3$ and $R_4$ are both methyl may be prepared by treating a suitable primary amine with formic acid and formaldehyde. Amines in which $R_3$ is benzyl may be prepared by treating the primary amine with benzaldehyde and then treating the resulting product with sodium borohydride or hydrogen in the presence of a suitable catalyst such as Raney nickel to form the corresponding benzylamino derivative. The monomethyl amino compound may be prepared by treating the benzylamino derivative with formic acid and formaldehyde to form the methyl benzylamino derivative which can be catalytically cleaved to form the monomethyl derivative.

The compounds in which $R_3$ is cycloalkyl may be prepared by treating a corresponding primary amine with a suitable ketone such as cyclohexanone in the presence of hydrogen in ethanol to form the corresponding amine.

The compounds of the present invention may be employed as glycine-type chelating agents in chemical processes in which it is desired to inactivate heavy metal ions, especially ferric ions. When used as chelating agents the compounds are dissolved in the solution containing the heavy metal ions in an amount calculated to be sufficient to inactivate or reduce the undesirable ion concentration to a desired level.

The compounds may also be used as intermediates in the preparation of more complex chemical compounds. The thiocyanic acid addition salts of the compounds of this invention, when condensed with formaldehyde, form resinous materials useful as pickling agents according to U.S. Pats. 2,425,320 and 2,606,155. The compounds also form fluosilicic acid addition salts which are useful as wood preservatives and mothproofing agents according to U.S. Pats. 1,915,334 and 2,075,359.

The compounds disclosed are pharmacologically active as cardiac stimulants which increase the rate of the heart. The compound β-(p-chlorophenylthio)-α-methylalanine when administered intravenously in doses of 1, 3 and 10 mg./kg. of body weight to dogs which were vagotomized and anesthetized, increased the heart rate significantly without effecting significant changes in the EKG responses.

When employed as pharmaceutical agents the active compounds are preferably combined with conventional pharmaceutical diluents, flavoring agents, disintegrating agents and lubricants and then formed into conventional dosage forms for oral or parenteral administration such as capsules, tablets and parenteral solutions. Generally the dosage forms will contain from 2 mgm. to 50 mgm. of the active ingredient.

Representative of suitable pharmaceutical compositions which may be prepared is the following:

TABLETS

|   |   | Mg. |
|---|---|---|
| (1) | β-(p-chlorophenylthio)-α-methylalanine | 10 |
| (2) | Starch U.S.P. | 57 |
| (3) | Lactose U.S.P. | 73 |
| (4) | Talc U.S.P. | 9 |
| (5) | Stearic acid | 6 |

Powders 1, 2 and 3 are slugged, then granulated, mixed with 4 and 5 and tableted.

The daily dose of the active ingredient will normally range from 0.01 to 10 mg./kg. per day. The exact amount to be prescribed will, of course, depend upon many factors, including the patient's age, weight and condition.

The following examples illustrate the practice of the invention:

EXAMPLE 1

1-(p-Chlorophenylthio)-2-propanone

To a solution of 120 g. (3 moles) of NaOH in 2 liters of $H_2O$ is added with stirring 435 g. (3 moles) of p-chlorothiophenol and the resulting mixture is heated to 50° for 0.5 hours. To the mixture is added dropwise with cooling and stirring 300 g. (3.24 moles) of chloroacetone so as to maintain the reaction temperature at 21–24°. The addition requires 45 minutes. The reaction mixture is stirred at 21–24° for an additional 2 hours and is extracted with 1.5 liters of benzene. The benzene layer is dried over anhydrous $Na_2SO_4$ and the solvent removed *in vacuo*. The residue is distilled to give 1-(p-chlorophenylthio)-2-propanone, b.p. 104–105°/0.4 mm.

*Analysis.*—Calcd. for $C_9H_9ClOS$: S, 15.98. Found: S, 15.85.

EXAMPLE 2

4-(p-Chlorophenylthiomethyl)-4-methylhydantoin

A dispersion of 30 g. (0.15 mole) of 1-(p-chlorophenylthio)-α-propanone, 124 g. (1.34 moles) of $(NH_4)_2CO_3$ and 13.4 g. (0.21 mole) of KCN in a solution of 400 ml. of ethanol and 400 ml. of water is refluxed for 10 hours and stirred at 25° for 6 hours. The solution is concentrated to 300 ml., filtered and cooled. The precipitated solids are collected and recrystallized from ethanol to yield 4-(p-chlorophenylthiomethyl)-4-methylhydantoin in the form of a white solid, m.p. 196–197°.

*Analysis.*—Calcd. for $C_{11}H_{11}ClN_2O_2S$: S, 11.85. Found: S, 11.81.

EXAMPLE 3

β-(p-Chlorophenylthio)-α-methylalanine hydrochloride

A mixture of 10 g. (0.037 mole) of 4-(p-chlorophenylthiomethyl)-4-methylhydantoin and 47 g. (0.152 mole) of $BaOH·8 H_2O$ in 250 ml. of water is refluxed for 19 hours. It is then cooled, acidified with concentrated $H_2SO_4$ and filtered. The collected solids are added to 200 ml. of 5% HCl solution and stirred at 25° for 1 hour. The mixture is filtered and the filtrate carefully adjusted to neutrality. The solids are collected and recrystallized from 110 ml. of 5% HCl solution to yield β-(p-chlorophenylthio)-α-methylalanine hydrochloride in the form of a light textured solid, m.p. 223–224° after a thorough drying at 100° *in vacuo*.

*Analysis.*—Calcd. for $C_{10}H_{13}Cl_2NO_2S$: S, 11.36. Found: S, 11.63.

EXAMPLE 4

β-(p-Methoxyphenylthio)-α-methylalanine hydrochloride

A mixture of 10 grams of 4-(p-methoxyphenylthiomethyl)-4-methylhydantoin, prepared in the manner described in Example 2, and 47 g. of $BaOH·H_2O$ in 250 ml. of water is reacted under reflux in the manner described in Example 3 to yield β-(p-methoxyphenylthio)-α-methylalanine hydrochloride.

EXAMPLE 5

β-(p-Nitrophenylthio)-α-methylalanine hydrochloride

A mixture of 10 grams of 4-(p-nitrophenylthiomethyl)-4-methylhydantoin, prepared in the manner described in Example 2, and 47 g. of $BaOH·8 H_2O$ in 250 ml. of water is reacted under reflux in the manner described in Example 3 to yield β-(p-nitrophenylthio)-α-methylalanine hydrochloride.

I claim:

1. The method of increasing the heart rate in an animal which comprises administering to said animal a daily dose of 0.01 to 10 mg./kg. of β-(p-chlorophenylthio)-α-methylalanine.

References Cited

Goodman et al., Journal Org. Chem., Vol. 23, pp. 1251—7 (9–58).

JEROME D. GOLDBERG, Primary Examiner